(12) United States Patent
Iwami et al.

(10) Patent No.: US 8,789,643 B2
(45) Date of Patent: Jul. 29, 2014

(54) MOTOR CONTROL APPARATUS

(75) Inventors: Tomoya Iwami, Obu (JP); Katsuki Ishigaki, Handa (JP); Kenji Shimizu, Kariya (JP)

(73) Assignee: Denso Corporation, Kariya (JP)

( * ) Notice: Subject to any disclaimer, the term of this patent is extended or adjusted under 35 U.S.C. 154(b) by 208 days.

(21) Appl. No.: 13/557,428

(22) Filed: Jul. 25, 2012

(65) Prior Publication Data

US 2013/0060408 A1 Mar. 7, 2013

(30) Foreign Application Priority Data

Sep. 6, 2011 (JP) ................................. 2011-194035

(51) Int. Cl.
*B60R 25/06* (2006.01)

(52) U.S. Cl.
USPC ................. 180/287; 70/245; 70/275; 701/49; 192/220.2; 192/220.7

(58) Field of Classification Search
CPC ... B50R 25/06; B60T 1/005; F16H 2061/283; F16H 2061/326; F16H 61/32; F16H 63/483
See application file for complete search history.

(56) References Cited

U.S. PATENT DOCUMENTS

| 6,744,349 | B1 * | 6/2004 | Asakura et al. | 340/5.62 |
|---|---|---|---|---|
| 2009/0091284 | A1 * | 4/2009 | Isobe et al. | 318/561 |
| 2011/0112732 | A1 * | 5/2011 | Ueno | 701/51 |

FOREIGN PATENT DOCUMENTS

| JP | 10-272913 | 10/1998 |
|---|---|---|
| JP | 2003-074238 | 3/2003 |
| JP | 4187619 | 9/2008 |
| JP | 2009-68655 | 4/2009 |
| JP | 2009-095101 | 4/2009 |
| JP | 2009-293706 | 12/2009 |

\* cited by examiner

*Primary Examiner* — Helal A Algahaim
*Assistant Examiner* — Charles J Han
(74) *Attorney, Agent, or Firm* — Nixon & Vanderhye PC

(57) ABSTRACT

A motor control apparatus includes an electric motor, a homing control section, a distance determination section, and a forbiddance section. The electric motor moves a control object equipped to a vehicle at least between two positions. The homing control section executes a homing control for controlling the electric motor to move the control object so that the control object press-contacts a stopper wall when an initialization condition is satisfied. The distance determination section determines whether a user of the vehicle is apart from the vehicle at a distance greater than a predetermined distance. The forbiddance section forbids the homing control during a period, which starts at a time of the homing control execution and ends at a time when the user of the vehicle is apart from the vehicle farther than the predetermined distance, even when the initialization condition is satisfied during the period.

8 Claims, 9 Drawing Sheets

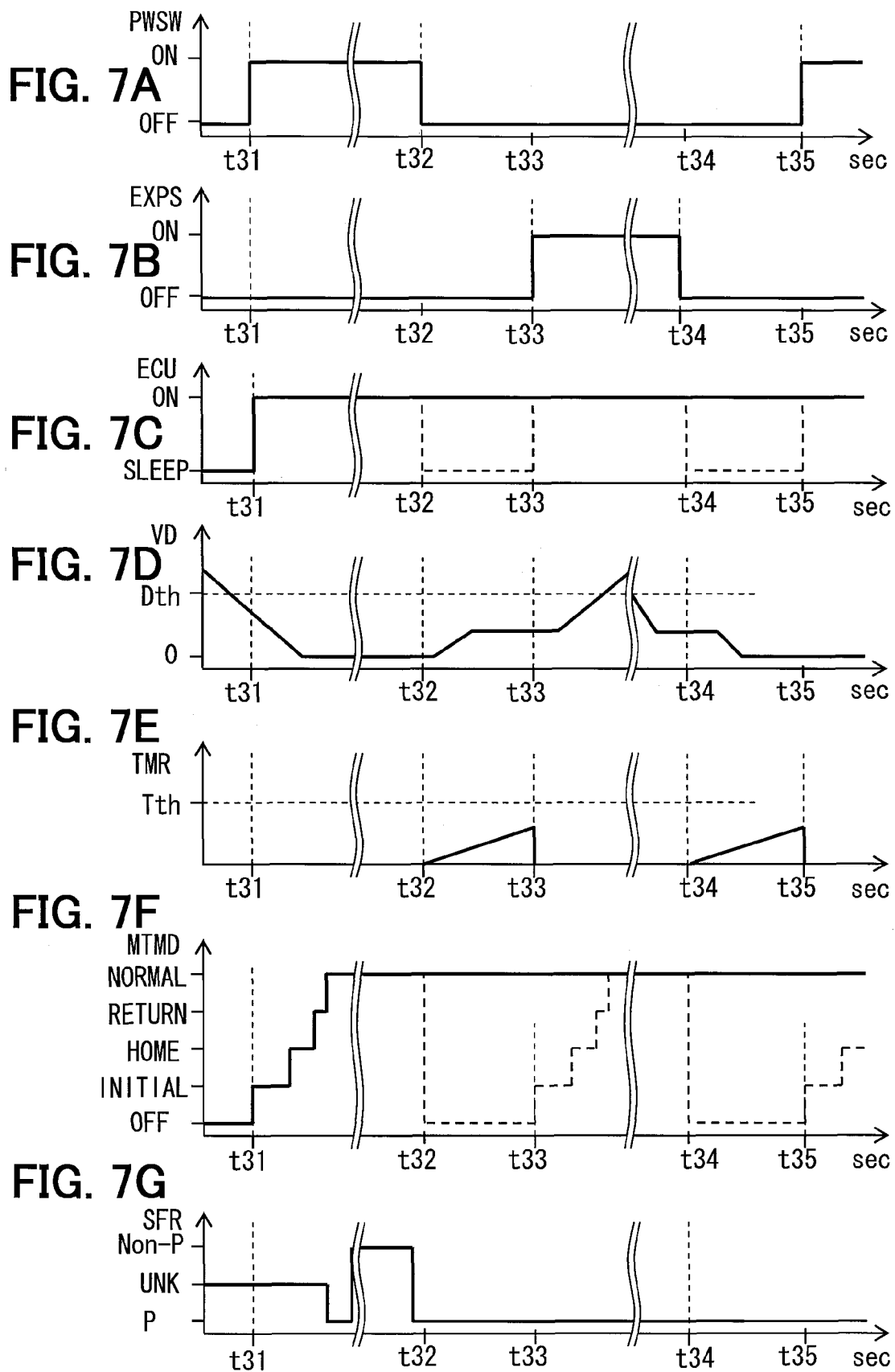

MOTOR CONTROL APPARATUS

CROSS REFERENCE TO RELATED APPLICATIONS

This application is based on Japanese Patent Application No. 2011-194035 filed on Sep. 6, 2011, the disclosure of which is incorporated herein by reference.

TECHNICAL FIELD

The present disclosure relates to a motor control apparatus that sets a reference position of a motor as an original point by controlling a motor to move a control object to a limit position.

BACKGROUND

JP-B2-4187619 and JP-B2-4535174 (corresponding to US 2011/0112732) disclose an apparatus that switches a shift position of an automatic transmission apparatus using a motor. Specifically, the apparatus disclosed in JP-4187619 sets a reference position for controlling the motor by moving a control object to a stopper wall until the control object strikes the stopper wall.

Conventionally, when a power switch of the vehicle is turned on, the motor is operated to move a control object to the stopper wall until the control object strikes and presses the stopper wall. During the control object presses the stopper wall, components of the motor may be distorted or worn out. Thus, the number of times that the control object presses the stopper wall needs to be reduced.

SUMMARY

In view of the foregoing difficulties, it is an object of the present disclosure to provide a motor control apparatus that reduces the number of times that a control object operated by a motor presses a stopper wall. It is another object of the present disclosure to provide a motor control apparatus that reduces the number of times that a control object operated by a motor presses a stopper wall even when the motor is configured to operate the control object to strike the stopper wall in response to various factors.

According to an aspect of the present disclosure, a motor control apparatus includes an electric motor, a homing control section, a distance determination section, and a forbiddance section. The electric motor moves a control object equipped to a vehicle at least between two positions. The homing control section executes a homing control for controlling the electric motor to move the control object so that the control object press-contacts a stopper wall when an initialization condition is satisfied. The distance determination section determines whether a user of the vehicle is apart from the vehicle at a distance greater than a predetermined distance. The forbiddance section forbids the homing control section to execute the homing control again during a period, which starts at a time when the homing control is executed and ends at a time when the distance determination section determines that the user of the vehicle is apart from the vehicle at the distance greater than the predetermined distance, even when the initialization condition is satisfied during the period.

In the above apparatus, the homing control is executed when the initialization condition is satisfied. The initialization condition may be satisfied frequently. Thus, the homing control is controlled to be forbidden during the user of the vehicle stays within a distance less than the predetermined distance from the vehicle even when the initialization condition is satisfied again. Thus, the homing control is prevented from being executed frequently, thereby reducing the number of executions of homing control.

BRIEF DESCRIPTION OF THE DRAWINGS

The above and other objects, features and advantages of the present disclosure will become more apparent from the following detailed description made with reference to the accompanying drawings. In the drawings:

FIG. 7A to FIG. 7G are time charts showing another exemplary operation of the motor control apparatus according to the first embodiment;

DETAILED DESCRIPTION

Embodiments of the present disclosure will be described with reference to the drawings. In each of the following embodiments, the same reference number is added to the same or equivalent parts, which are described in a preceding embodiment, to avoid unnecessary repeated description. In each of the following embodiments, when a configuration of the present disclosure is partially described, the other part may be configured in the same manner described in a preceding embodiment.

(First Embodiment)

Figure 1:
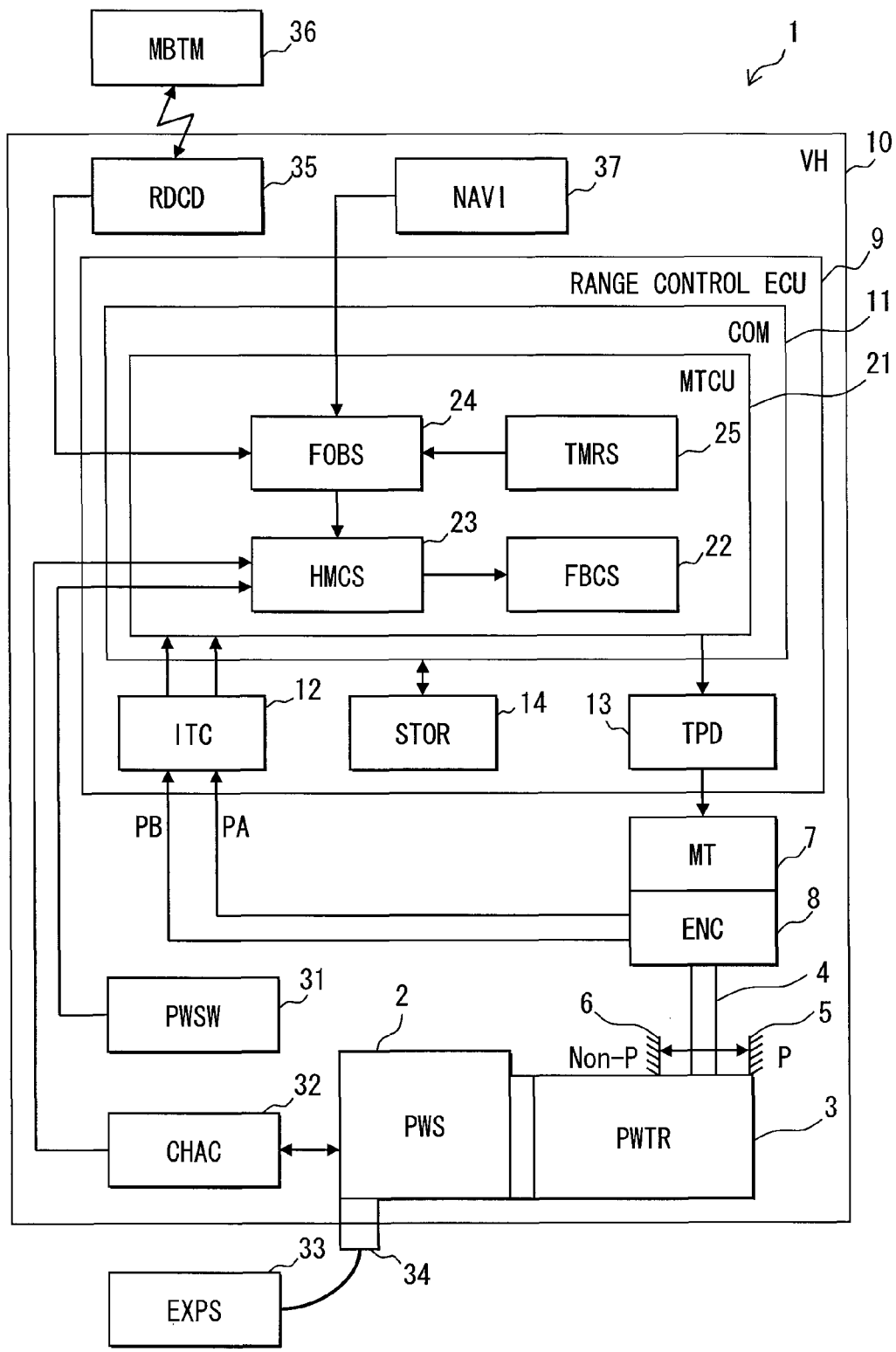
FIG. 1 is a block diagram showing a motor control apparatus according to a first embodiment of the present disclosure.

As shown in FIG. 1, the motor control apparatus 1 is equipped to a vehicle (VH) 10. Since the motor control apparatus 1 controls a control object using an electric motor in a shift-by-wire mode, hereinafter the motor control apparatus 1 is also referred to as a shift-by-wire (SBW) apparatus 1. The vehicle 10 includes a power source (PWS) 2 and a power transmission mechanism (POTR) 3. The power source 2 includes an internal-combustion engine and an electric traction motor. The vehicle 10 is a hybrid electric vehicle, which can run by one of the internal-combustion engine and the electric traction motor, or by both the internal-combustion engine and the electric traction motor. The power source 2 further includes a rechargeable secondary battery. The electric traction motor is driven by electric power supplied from the secondary battery.

The power transmission mechanism 3 transmits a driving force generated by the power source 2 to drive wheels of the vehicle 10. The power transmission mechanism 3 is switchable among different power transmission states. For example, the power transmission mechanism 3 may be a vehicular automatic transmission. The power transmission state of the power transmission mechanism 3 is also referred to as a shift position, a shift range or a speed change position. The power transmission state may include a non-parking position and a parking position. The non-parking position and the parking position are shown by "Non-P" and "P", respectively, in the following description and drawings. When the power transmission mechanism 3 is set to the Non-P position, the power transmission mechanism 3 allows a movement of the vehicle 10 by transmitting the driving force generated by the power source 2 to the drive wheels. When the power transmission mechanism 3 is set to the P position, the power transmission mechanism 3 forbids a movement of the vehicle 10 by interrupting a transmission of the driving force to the drive wheels. The power transmission mechanism 3 includes a manual lever 4. The manual lever 4 may be referred to as a lock member 4. The lock member 4 is movable between at least two positions including the Non-P position and the P position so that the power transmission state is switched between the Non-P position and the P position. The lock member 4 corresponds to the control object controlled by the motor control apparatus 1 according to the present disclosure. The power transmission mechanism 3 includes two stopper walls 5, 6 respectively arranged at two ends of an operatable range of the lock member 4 so that a movement of the lock member 4 is mechanically restricted between the two stopper walls 5, 6. The two stopper walls 5, 6 may also be arranged in a speed reduction mechanism. When a center position of the operatable range of the lock member 4 is defined as a home position, the stopper wall 5, which is also referred to as a P wall, is arranged at a position farther than the P position from the home position, and the stopper wall 6, which is also referred to as a Non-P wall, is arranged at a position farther than the Non-P position from the home position.

The SBW apparatus 1 includes an electric motor (MT) 7, an encoder (ENC) 8, and a range control ECU 9. The electric motor 7 changes a position of the lock member 4 by moving the lock member 4. The electric motor 7 is a three-phase switched reluctance motor.

The encoder 8 is a two-phase incremental encoder. The encoder 8 is coupled to a rotation axis of the electric motor 7. The encoder 8 outputs a signal according to a predetermined rotation angle of the electric motor 7. When the electric motor 7 rotates, the encoder 8 outputs multi-phase signals having different phases. Each signal having a different phase from another reverses at predetermined rotation angle intervals. The encoder 8 outputs at least an A-phase signal PA and a B-phase signal PB. A level of the A-phase signal PA reverses at predetermined rotation angle intervals. The B-phase signal PB has a phase shift compared with the A-phase signal PA, and a level of the B-phase signal PB reverses at predetermined rotation angle intervals. The encoder 8 detects switch points, when excitation phases of the electric motor 7 switch in a predetermined order, according to reverse points when the A-phase signal PA and the B-phase signal PB reverse.

The range control ECU 9 controls a movement of the lock member 4 according to a position of a lever, which is manipulated by a driver of the vehicle 10. For example, the lever may be a switch or a button, which is manipulatable. The lever can be manually manipulated to a P position or a Non-P position in a selective manner. More specifically, when the P position of the lever is selected by the driver, the lock member 4 is moved to the P position of the power transmission mechanism 3 by the electric motor 7. Similarly, when the Non-P position of the lever is selected by the driver, the lock member is moved to the Non-P position of the power transmission mechanism 3 by the electric motor 7. The range control ECU 9 includes a microcomputer (COM) 11, an input circuit (ITC) 12, a three-phase driving circuit (TPD) 13, and a storage (STOR) 14. The input circuit 12 performs a waveform shaping to the signals output from the encoder 8, and then inputs the shaped signals to the microcomputer 11 as interrupt signals. The three-phase driving circuit 13 controls energization of three-phase coils. The storage 14 is a semiconductor storage for storing a program executed by the microcomputer 11 in order to control the electric motor 7. The microcomputer 11 provides a controller for controlling the electric motor 7 according to signals output from the encoder 8. The microcomputer 11 detects a rotation position of the electric motor 7 according to the A-phase signal PA and the B-phase signal PB. Further, the microcomputer 11 provides a feedback controller for controlling a position of the electric motor 7, that is, a position of the lock member 4, by controlling the three-phase driving circuit 13.

The microcomputer 11 includes a computer readable storage medium (not shown). The storage medium of the microcomputer 11 non-temporarily stores a computer readable program. For example, as the storage medium, the semiconductor storage 14 or an additional magnetic disk may be used. The range control ECU 9 executes a control method, which will be described later, by executing a program stored in the storage medium so that the range control ECU control the motor control apparatus 1 to operate in a manner described in the present disclosure. The range control ECU 9 includes sections, which are executed by the microcomputer 11 in order to achieve predetermined different functions. Each section may also be referred to as a functional block or module.

The microcomputer 11 includes a motor control unit (MTCU) 21. The motor control unit 21 includes a feedback control section (FBCS) 22, a homing control section (HMCS) 23, a forbiddance section (FOBS) 24, a timer section (TMRS) 25, and a distance determination section. The feedback control section 22 controls the electric motor 7 in a feedback manner according to signals PA, PB output from the encoder 8. The feedback control section 22 controls the electric motor 7 so that a present position of the lock member 4 is consistent with a target position. The feedback control section 22 detects a position of the lock member 4 by counting the signals PA and PB, which are output from the encoder 8, based on a reference position. The reference position, which will be described later, is set by the homing control section 23. Since the reference position is used as a reference in a homing control, which will be described later, the reference position is also referred to as a home position or original position hereinafter. A position of the lock member 4 corresponds to one of the shift ranges described above.

The homing control section 23 executes the homing control when a predetermined initialization condition is satisfied. The homing control is also referred to as a wall abutment control, and accordingly, the homing control section is also referred to as a wall abutment control section. The homing control is executed by the homing control section 23 in such a manner that the electric motor 7 is operated by the homing control section 23 to move the lock member 4 until the lock member 4 strikes the P wall 5 and stops. By this operation, the homing control section 23 sets the home position for controlling the electric motor 7. In the present disclosure, the initialization condition may have one or more condition items, and when any one of the condition items is satisfied, the initialization condition is determined to be satisfied. Accordingly, the homing control section 23 may be configured to execute the homing control when one of the condition items is satisfied.

When predetermined forbiddance conditions are satisfied, the forbiddance section 24 forbids the homing control section 23 to execute the homing control. Specifically, the forbiddance section 24 maintains the range control ECU 9 and the microcomputer 11 at operation states in order to prevent the homing control is executed again. Hereinafter, a state during an operation is also referred to as an ON state, and a state during a non-operation is also referred to as an OFF state. The forbiddance section 24 permits or forbids the homing control according to a behavior of a user. For example, during the user is carrying out a work related to the vehicle 10, the homing control is forbidden. That is, during the user is at a place near the vehicle 10, the homing control is forbidden. Further, after the user moves away from the vehicle 10, the homing control is permitted. Specifically, (i) when determination of the initialization condition is switched to failure and (ii) the distance determination section determines that the user of the vehicle 10 is apart from the vehicle 10 at a distance greater than a predetermined threshold distance Dth, the forbiddance section 24 permits the homing control section 23 to execute the homing control. Further, the forbiddance section 24 sets threshold values including the threshold distance Dth and a threshold time Tth, which are used for determining whether the predetermined forbiddance conditions are satisfied or not. More specifically, the forbiddance section 24 sets the threshold values according to a possibility of charging the secondary battery equipped to the vehicle 10. For example, during the vehicle 10 is located at a place highly possible to being charged, the homing control is set to be forbidden for a long period.

The timer section 25 measures an elapsed time TMR. The elapsed time TMR is compared with the threshold time Tth set by the forbiddance section 24. The timer section 25 is used for forbidding determination of the initialization condition for a predetermined period. During the user of the vehicle 10 is determined to be within the threshold distance Dth from the vehicle 10, the timer section 25 measures the elapsed time TMR. For example, when the elapsed time TMR measured by the timer section 25 exceeds the threshold time Tth set by the forbiddance section 24, the forbiddance section 24 permits the homing control section 23 to execute the homing control.

The vehicle 10 includes a power switch (PWSW) 31. When the vehicle is being driven, the power switch 31 is set to an ON state, and when the vehicle is being stopped, the power switch 31 is set to an OFF state. State information indicative of a state (ON state or OFF state) of the power switch 31 is input to the homing control section 23. When the power switch 31 is operated from the OFF state to the ON state, the homing control section 23 determines that the driving the vehicle 10 is being started. Thus, in order to correctly control a shift position of the power transmission mechanism 3, an operation state of the power switch 31 is set as a first condition item. More specifically, when the power switch is in the ON state, the first condition item is satisfied, accordingly the initialization condition is satisfied.

The vehicle 10 includes an electric charge controller (CHAC) 32. The electric charge controller 32 controls a charging of the secondary battery equipped in the power source 2. The secondary battery is charged by an external power source (EXPS) 33. The external power source 33 may supply electric power, which is supplied by a wide area power grid or a small-scale power generation facility, to the secondary battery. The external power source 33 may be set at a commercial plug-in station or in a dwelling unit. The external power source 33 is coupled to the vehicle 10 by coupling a connection member 34 to the vehicle 10. When the external power source 33 is coupled to the vehicle 10, the external power source 33 is in an ON state, and when the external power source 33 is not coupled to the vehicle 10, the external power source 33 is in an OFF state. The connection member 34 is detachable from the vehicle 10. During the vehicle 10 is being driven by the user, the connection member 34 is detached from the vehicle 10. For example, the connection member 34 may be a connector that electrically couples an electric power line to an object inserted to the connector, or a contactless electromagnetically-coupled power provider. The electric charge controller 32 provides a detection section, which detects whether the connection member 34 is coupled to the vehicle 10 or not. The electric charge controller 32 sends information indicating that the connection member 34 is coupled to the vehicle 10, that is, the external power source 33 is in the ON state, to the homing control section 23. During the connection member 34 is coupled to the vehicle 10, the vehicle 10 is preferred to be restrained by setting the power transmission mechanism 3 to the P position. Thus, in order to restrain the vehicle with certainty during the external power source 33 is coupled to the vehicle 10, a coupling state of the connection member 34 is set as a second condition item. More specifically, when the connection member 34 is coupled to the vehicle 10, the second condition item is satisfied, accordingly the initialization condition is satisfied.

The vehicle 10 includes a radio communication device (RDCD) 35 and a mobile terminal (MBTM) 36. The mobile terminal 36 is carried by the user or driver of the vehicle 10. The radio communication device 35 is communicably coupled to the mobile terminal 36 so that wireless data communication is enabled between the radio communication device 35 and the mobile terminal 36. The radio communication device 35 and the mobile terminal 36 provide a wireless door lock apparatus for a vehicle. The wireless door lock apparatus is also referred to as a smart entry system. The radio communication device 35 detects whether the mobile terminal 36 is near the vehicle 10 or not. When the radio communication device 35 detects that the mobile terminal 36 is near the vehicle 10, the radio communication device 35 unlocks the vehicle 10. Further, when the radio communication device 35 detects that the mobile terminal 36 is at a distance, which is greater than a predetermined distance, the radio communication device 35 locks the vehicle 10. The radio communication device 35 sends information indicating whether the mobile terminal 36 is near the vehicle 10 or not to the forbiddance section 24. In other words, the radio communication device 35 determines whether the user of the vehicle 10 is at a distance greater than the threshold distance Dth, and sends information indicating a result of the determination to the forbiddance section 24. Thus, the communicator 35 and the mobile terminal 36 provide the distance determination section.

The vehicle 10 includes a navigation device (NAVI) 37. The navigation device 37 displays a position of the vehicle in a map, and supports driving of the vehicle 10. The navigation device 37 detects a present position of the vehicle 10. Further, the navigation device 37 records positions related to the vehicle 10 in the map. The navigation device 37 sends position information related to the vehicle 10 to the forbiddance section 24. The position information includes information related to the present position of the vehicle 10. For example, the information related to the present position of the vehicle 10 may be information indicating whether the present position of the vehicle 10 is a residence of the driver, or may be information indicating whether the present position of the vehicle 10 is a plug-in station.

Figure 2:
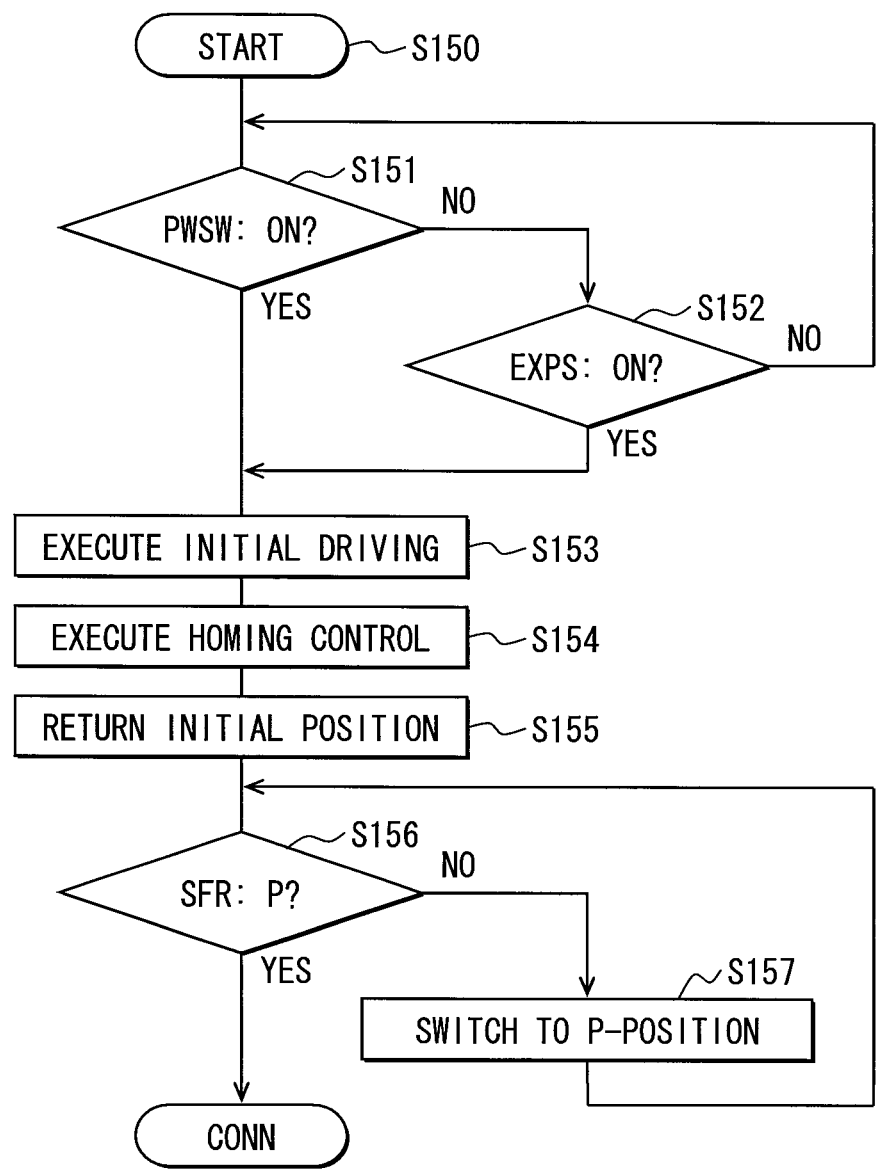
FIG. 2 is a flowchart showing a control process of the motor control apparatus according to the first embodiment.
Figure 3:
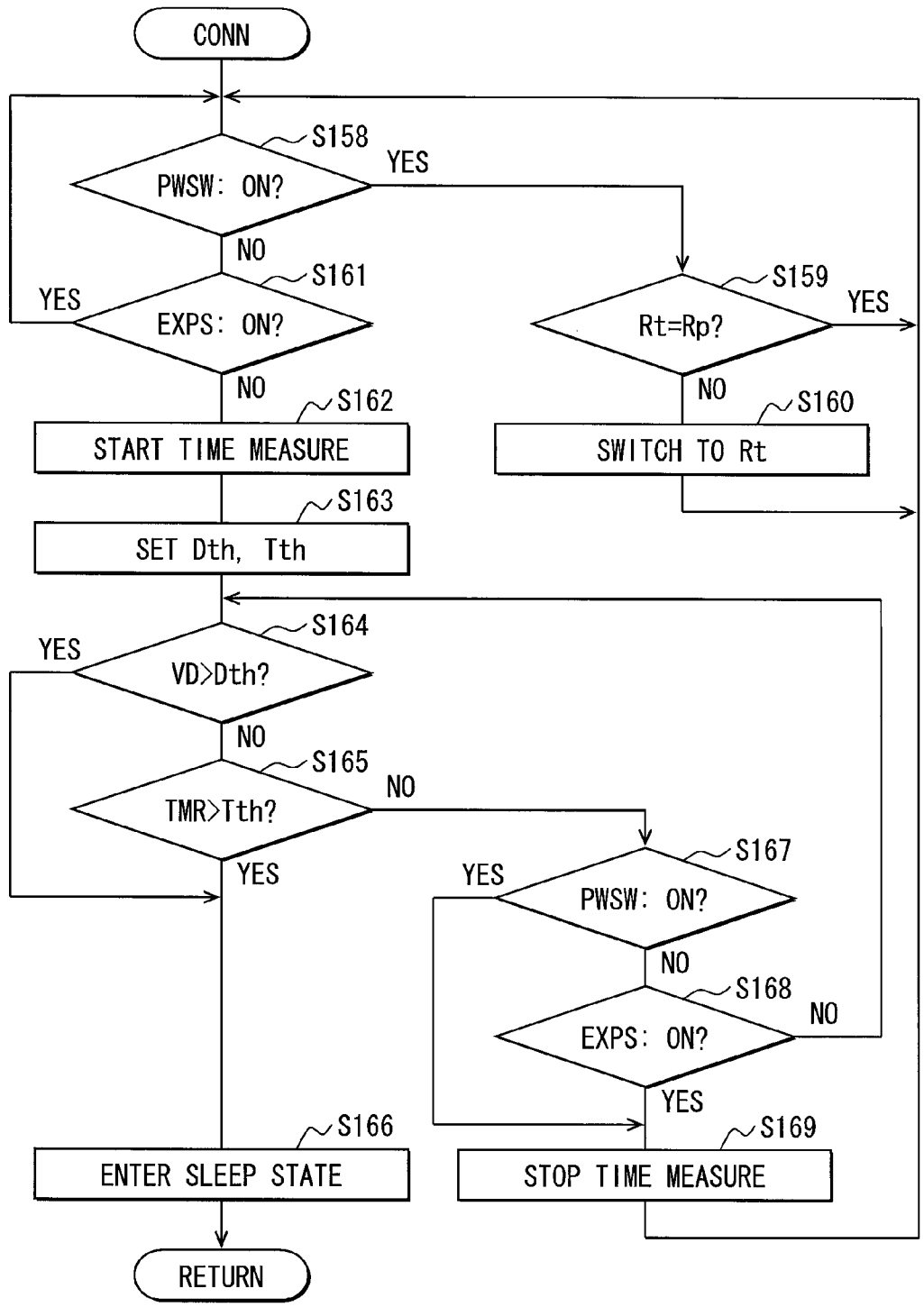
FIG. 3 is a flowchart showing a control process of the motor control apparatus according to the first embodiment.

FIG. 2 and FIG. 3 are flowcharts showing a homing control process executed by the motor control unit 21 of the SBW apparatus 1 according to the first embodiment. The flowchart shown in FIG. 2 and the flowchart shown in FIG. 3 may be connected by a connector (CONN). As shown in FIG. 2, at S151, the motor control unit 21 determines whether the power switch 31 is in the ON state. When the power switch 31 is in the ON state (S151: "YES"), the process proceeds to S153.

When the power switch 31 is in the OFF state (S151: "NO"), at S152, the motor control unit 21 further determines whether the external power source 33 is coupled to the vehicle 10 (i.e., the external power source 33 is in the ON state) via the connection member 34. When the external power source 33 is coupled to the vehicle via the connection member 34 (S152: "YES"), the process proceeds to S153. At S153, the electric motor 7 is operated to execute initial driving. Specifically, the electric motor 7 is operated to move toward the P wall 5 irrespective of the signals PA, PB output from the encoder 8. At S154, the motor control unit 21 executes the homing control. Specifically, the motor control unit 21 rotates the electric motor 7 until the lock member 4, which is moved by the electric motor 7, strikes the P wall 5, and further rotates the electric motor 7 so that the lock member 4 presses the P wall 5. Further, at S154, the motor control unit 21 sets the home position in order to execute the feedback control to the electric motor 7. At S155, the motor control unit 21 rotates the electric motor 7 so that the lock member 4 returns to an initial position. Specifically, the lock member 4 returns from the P wall 5 to the P position. As described above, S151 to S155 executed by the motor control unit 21 provide the homing control section. More specifically, 5151 to S155, in which the electric motor 7 is controlled to move the lock member 4 so that the lock member 4 presses the P wall 5 under a condition that the initialization condition is satisfied, provide the homing control section 23. In the homing control section 23 (S151 to S155), S151 and S152 provide a first condition determination section that determines whether the initialization condition is satisfied.

At S156, the motor control unit 21 determines whether the shift position is in the P position. When the shift position is not in the P position (S156: "NO"), the process proceeds to S157. At S157, the motor control unit 21 alerts the user so that the user sets the shift position to the P position. Further, at S157, the motor control unit 21 controls the electric motor 7 so that the shift position is automatically switched to the P position. When a determination result at S151 is "YES" or a determination result at S152 is "YES", the shift position is preferred to be in the P position. Thus, S156 and S157 executed by the motor control unit 21 provide a shift position setting section that sets the shift position to the P position with certainty.

As shown in FIG. 3, at S158, the motor control unit 21 determines whether the power switch 31 is in the ON state. When the power switch 31 is in the ON state (S158: "YES"), the process proceeds to S159. At S159, the motor control unit 21 determines whether a shift range switch is necessary. Specifically, the motor control unit 21 determines whether a target shift range Rt and a present shift range Rp is the same. When the target shift range Rt is the same with the present shift range Rp, the process returns to S158. When the target shift range Rt is different from the present shift range Rp, the process proceeds to S160. At S160, the motor control unit 21 controls the electric motor 7 so that the present range Rp is the same with the target range Rt. S160 executed by the motor control unit 21 provides the feedback control section 22. When the power switch 31 is in the ON state, that is the vehicle 10 is being driven, S158 to S160 are executed repeatedly. Thus, a normal range shift is achieved by S158 to S160.

When the motor control unit 21 determines that the power switch 31 is not in the ON state (S158: "NO"), the process proceeds to S161. At S161, the motor control unit 21 determines whether the external power source 33 is coupled to the vehicle 10 via the connection member 34 (i. e., the external power source 33 is in the ON state). When the external power source 33 is coupled to the vehicle 10 via the connection member 34 (S161: "YES"), the process returns to S158. Thus, when the power switch is in the OFF state and external power source 33 is in the ON state, S158 and S161 are repeatedly executed. Under this configuration, during the external power source 33 is coupled to the vehicle 10, the range control ECU 9 does not enter a SLEEP state. When the range control ECU 9 enters the SLEEP state, information of the home position, which is obtained by a previous homing control, is deleted from the range control ECU 9. As described above, during the external power source 33 is coupled to the vehicle 10, since the range control ECU 9 does not enter the SLEEP state, the home position obtained by the previous homing control (S151 to S155), is reserved. When the external power source 33 is not coupled to the vehicle 10 (S161: "NO"), the process proceeds to S162. S158 to S161 detects an unattended state of the vehicle 10, in which the power switch 31 is in the OFF state and the external power source 33 is not coupled to the vehicle 10.

At S162, the motor control unit 21 begins a time measurement with the timer section 25. The elapsed time TMR is measured by the timer section 25. The timer section 25 measures the elapsed time TMR during the power switch 31 is in the OFF state and the external power source 33 is not coupled to the vehicle 10, that is, in the OFF state. In other words, the timer section 25 measures the elapsed time TMR during the vehicle 10 is not being charged and being placed unattended. At S163, the motor control unit 21 sets the threshold distance Dth and the threshold time Tth. The threshold distance Dth is set for determining whether the mobile terminal 36 is apart from the vehicle 10 at a distance, which is greater than the threshold distance Dth. The threshold time Tth is set for determining whether the user is near the vehicle 10 longer than the threshold time Tth. S163 executed by the motor control unit 21 provides a setting section for setting the threshold distance Dth and/or the threshold time Tth depending on a position of the vehicle 10. The threshold distance Dth and the threshold time Tth are variable values, which are dependent on the position of the vehicle 10. Thus, the threshold time Tth, during which the motor control unit 21 waits in order to execute the homing control, can be set differently depending on the position of the vehicle 10.

The threshold distance Dth is set according to the position of the vehicle. The position includes, for example, a parking position and a stop position. For example, when the vehicle 10 is located at a position, where the vehicle is highly possible to being charged such as a plug-in station, or at a storage area, the threshold distance Dth is set to a relatively great value. Under this configuration, for example, in a case where the vehicle 10 is located at a plug-in station, when the user is apart from the vehicle 10 at a relatively far distance, the homing control is forbidden. Further, in a case where the vehicle 10 is located at a road side of a downtown area, the threshold distance Dth is set to a relatively small value. Under this configuration, when the user is apart from the vehicle 10 at a slightly far distance, the range control ECU enters the SLEEP state.

When the vehicle 10 is located at a parking lot of a residence, the threshold time Tth is set to a relatively small value.

Since the vehicle 10 is parked at the parking lot of the residence, the user may not be apart from the vehicle 10 at a far distance. In this case, the range control ECU 9 enters the SLEEP state early by setting the threshold time Tth to the relatively small value. Further, when the vehicle 10 is located at a position where the vehicle is possible to being charged, such as a plug-in station, the threshold time Tth is set to a relatively great value.

The position of the vehicle 10 is obtained from the navigation device 37. The navigation device 37 transmits information indicative of the present position of the vehicle 10 and information related to the present position of the vehicle 10 to the motor control unit 21. For example, the navigation device 37 transmits information indicating whether the vehicle 10 is possible to being charged at a position to the motor control unit 21. Further, in the present embodiment, S182 executed by the motor control unit 21 provides a record section that records a position at which the external power source 33 is coupled to the vehicle 10, that is, a position at which the vehicle 10 is possible to being charged. S182 will be described in detail later. At S163, the threshold time Tth is set differently depending on information indicating whether the vehicle 10 is at the position, which is recorded by the record section.

At S164, the motor control unit 21 determines whether a distance VD between the vehicle 10 and the mobile terminal 36 is greater than the threshold distance Dth by comparing the distance VD with the threshold distance Dth. S164 executed by the motor control unit 21 provides a distance determination section that determines whether the user is apart from the vehicle 10 at a distance greater than the threshold distance Dth. When the distance VD is not greater than the threshold distance Dth (S164: "NO"), the process proceeds to S165. Further, when the distance VD is greater than the threshold distance Dth (S164: "YES"), the process proceeds to 5166. At S165, the motor control unit 21 determines whether the elapsed time TMR, which is measured by the timer section 25, exceeds the threshold time Tth by comparing the elapsed time TMR with the threshold time Tth. When the elapsed time TMR exceeds the threshold time Tth (S165: "YES"), the process proceeds to S166. At S166, the motor control unit 21 operates the range control ECU 9 to enter the SLEEP state. When the range control ECU 9 switches to the SLEEP state, the home position obtained from the previous homing control is lost. Thus, after the power switch 31 is operated to the OFF state, when the user moves away from the vehicle 10 to a distance greater than the threshold distance Dth, the range control ECU 9 enters the SLEEP state. Further, after the power switch 31 is operated to the OFF state, when (i) the user is within the threshold distance Dth from the vehicle 10 and (ii) the elapsed time TMR exceeds the threshold time Tth, the range control ECU enters the SLEEP state. In this case, the homing control is permitted to be executed.

When the elapsed time TMR does not excess the threshold time Tth (S165: "NO"), the process proceeds to S167. At S167, the motor control unit 21 determines whether the power switch 31 is in the ON state or not. When the power switch 31 is in the OFF state (S167: "NO"), the process proceeds to 5168. At S168, the motor control unit 21 determines whether the external power source 33 is coupled to the vehicle 10 or not. That is, motor control unit 21 determines whether the external power source 33 is in the ON state or not. When the external power source 33 is not coupled to the vehicle 10 via the connection member 34 (S168: "NO"), the process returns to S164. Thus, during the external power source 33 is not coupled to the vehicle 10, S164, S165, 5167, S168 are executed repeatedly. Thus, the timer section 25 measures the elapsed time TMR during the external power source 33 is not coupled to the vehicle 10. Further, during the elapsed time TMR, the range control ECU does not enter the SLEEP state. When the power switch 31 is in the ON state (S167: "YES") or the external power source 33 is coupled to the vehicle 10 (S168: "YES"), the process proceeds to S169. At S169, the timer section 25 stops the time measurement. Then, the process returns to S158. Under this configuration, when the power switch 31 is operated to the ON state or the external power source 33 is coupled to the vehicle 10 before the elapsed time TMR exceeds the threshold time Tth, the range control ECU 9 is prevented from entering the SLEEP state. As described above, during the elapsed time TMR, the vehicle 10 is in the unattended state. Under this configuration, information of the home position, which is obtained from the previous homing control, that is S151 to S155, is reserved. Thus, the homing control is prevented from being executed again.

S158 to S165 and 5167 and 5169 executed by the motor control unit 21 provide the forbiddance section 24. The forbiddance section 24 forbids the homing control being executed again by the homing control section 23 via S151 to S155 for a predetermined period even when the initialization condition is satisfied again during the predetermined period, during which the distance determination section S164 determines that the user stays within the threshold distance Dth from the vehicle 10. The forbiddance section 24 includes a second condition determination section S158, S161, which determines that the initialization condition is switched to failure. The forbiddance section 24 further includes a first forbiddance section S158 to S161 and a second forbiddance section S162 to S165, S167 to S169. The first forbiddance section S158 to S161 forbids the homing control during a first period. The first period starts from a time when the homing control is executed to a time when the initialization condition is determined to be switched to failure. The second forbiddance section S162 to S165, S167 to S169 forbids the homing control during a second period even when the initialization condition is satisfied again during the second period. The second period starts from the time when the initialization condition is determined to be switched to failure to a time when the distance determination section determines that the user is apart from the vehicle 10 at a distance greater than the threshold distance Dth. Under this configuration, after the homing control is executed when the initialization condition is satisfied, the homing control is forbidden to be executed again during the initialization condition is maintained in the satisfied state. Further, after the initialization condition is switched to failure, the homing control is still being forbidden.

S151 and S152 executed by the motor control unit 21 provide the first determination section, which determines that one of the first and second condition items is satisfied. As described above, the first condition item is satisfied when the power switch 31 is in the ON state, and the second condition item is satisfied when the external power source 33 is coupled to the vehicle 10 via the connection member 34. S153 to S155 executed by the motor control unit 21 provide a home position setting section by executing the homing control. S158 and 5161 executed by the motor control unit 21 provide a second determination section, which determines that the previously satisfied initialization condition is switched to failure. S162, S163 and S165 executed by the motor control unit 21 provide a waiting section, which starts waiting from the time when the initialization condition is determined to be switched to failure and ends waiting at a time when the elapsed time TMR is equal to the threshold time Tth. S167 and S168 executed by the motor control unit 21 provide a third determination section, which determines whether the initialization condition is satisfied again during a waiting time waited by the waiting section S162, S163 and S165. S158 to S168 executed by the motor control unit 21 provide a forbiddance section, which forbids the homing control to being executed again. S166 executed by the motor control unit 21 provides a permit section, which permits the homing control after the waiting time elapsed.

Figure 4:
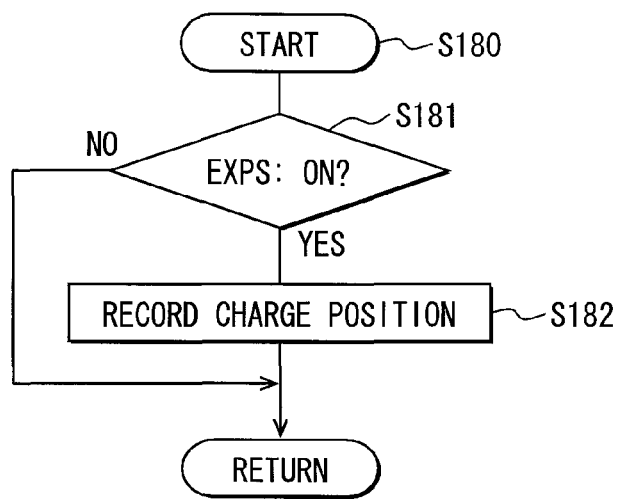
FIG. 4 is a flowchart showing a control process of the motor control apparatus according to the first embodiment.

FIG. 4 shows a flowchart of a process that records the position at which the vehicle 10 is being charged. The range control ECU 9 records the position, where the external power source 33 is coupled to the vehicle 10 via the connection member 34. Thus, a charging facility that is not recorded in the navigation device 37 is newly recorded. At S181, the range control ECU 9 determines whether the external power source 33 is coupled to the vehicle 10 or not. When the external power source 33 is coupled to the vehicle 10, the process proceeds to S182. At S182, the range control ECU 9 records the present position of the vehicle 10, which is obtained from the navigation device 37, as the charging facility. S182 executed by the range control ECU provides a record section, which records the position at which the external power source 33 is coupled to the vehicle 10.

Figure 5A:
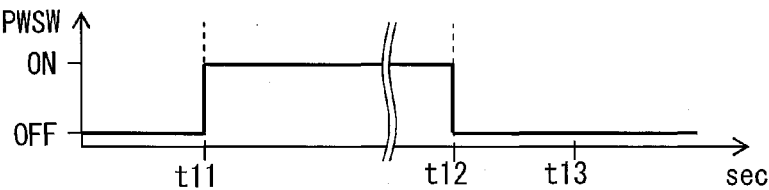
FIG. 5A to FIG. 5G are time charts showing an exemplary operation of the motor control apparatus according to the first embodiment.
Figure 5B:
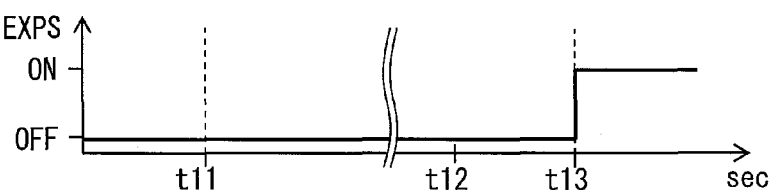
Figure 5C:
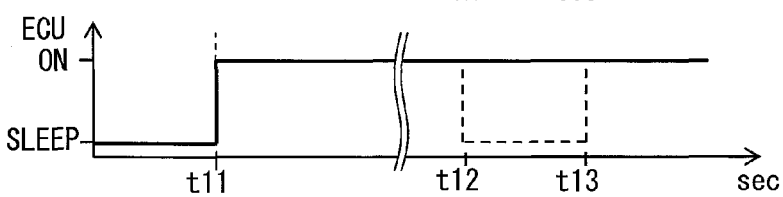
Figure 5D:
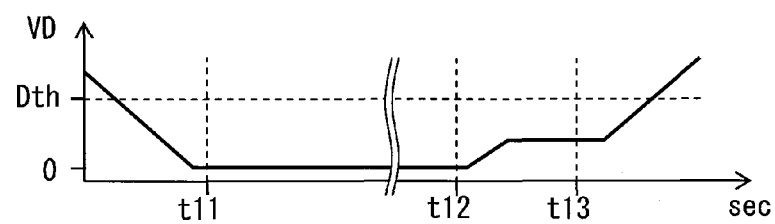
Figure 5E:
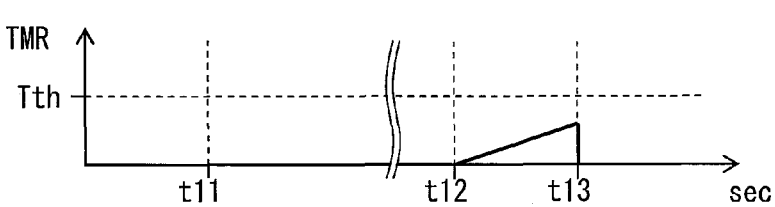
Figure 5F:
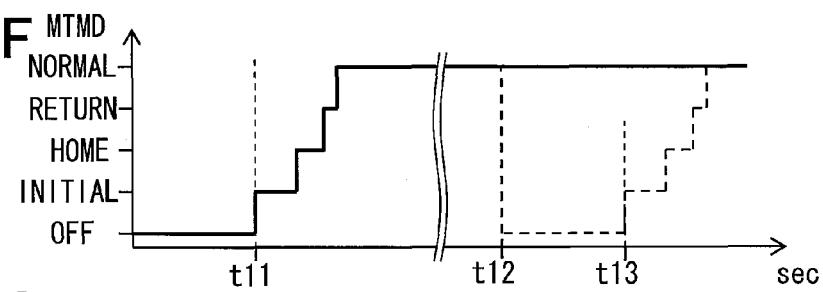
Figure 5G:
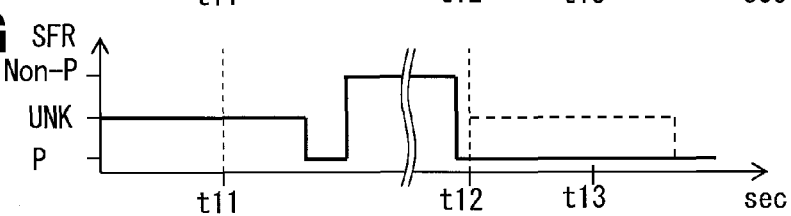

FIG. 5A to FIG. 5G are time charts respectively showing an operation state of the power switch (PWSW) 31, a connection state of the external power source (EXPS) 33, an operation state of the motor control unit (ECU) 21, a distance VD between the vehicle 10 and the user, an elapsed time TMR measured by the timer section, an operation mode (MTMD) of the electric motor 7, and a shift range (SFR) of the power transmission mechanism 3. FIG. 5A to FIG. 5G are showing an exemplary operation of the motor control apparatus 1 according to the first embodiment. The exemplary operation of the motor control apparatus 1 is executed in a case where the vehicle 10 is charged after the vehicle 10 is driven by the user. When the user moves toward the vehicle 10, the distance VD gradually decreases. At a point t11, the user gets in the vehicle 10, and sets the power switch 31 to ON state. When the power switch 31 is set to the ON state, the motor control unit 21 starts the homing control. When the homing control is started at the point t11, the operation mode of the electric motor 7 switches from an OFF state to an initial driving control state (INITIAL), a homing control state (HOME), return control state (RETURN), and a normal position control state (NORMAL) in the described order. With this operation, the home position of the electric motor 7 is defined, and the shift range is set from an undetermined position (UNK) to the P position. Then, the user switches the shift range from the P position to the Non-P position for driving the vehicle 10. After driving the vehicle 10, at a point t12, the user operates the power switch 31 to the OFF state. At a time just before the point t12, the user switches the shift range from the Non-P position to the P position for parking the vehicle 10. At the point t12, the power switch 31 is in the OFF state, and the external power source 33 is not coupled to the vehicle 10. Consequently, the timer section 25 starts to measure the elapsed time TMR from the point t12. The elapsed time TMR gradually increases from the point t12. After the point t12, the user gets out from the vehicle 10, and manipulates the connection member 34 around the vehicle 10. At a point t13, the user couples the external power source 33 to the vehicle 10 by manipulating the connection member 34. The threshold distance Dth is set so that the threshold distance Dth is greater than the distance VD between the vehicle 10 and the user during the user manipulates the connection member 34. In other words, the threshold distance Dth is set so that the threshold distance Dth is greater than the distance VD between the vehicle 10 and the user during a normal charging operation. After the point t13, the user moves away from the vehicle 10. In this case shown in FIG. 5A to FIG. 5G, the range control ECU 9 does not enter the SLEEP state after the execution of the homing control, which is executed in response to a satisfaction of the first condition item, that is, the power switch 31 is operated to the ON state. Thus, when the external power source 33 is coupled to the vehicle 10 at the point t13, the information of the home position obtained by the homing control executed at the point t11 is reserved. Thus, during the point t12 to the point t13, the homing control shown by a dashed line in FIG. 5C is prevented from being executed again.

Figure 6A:
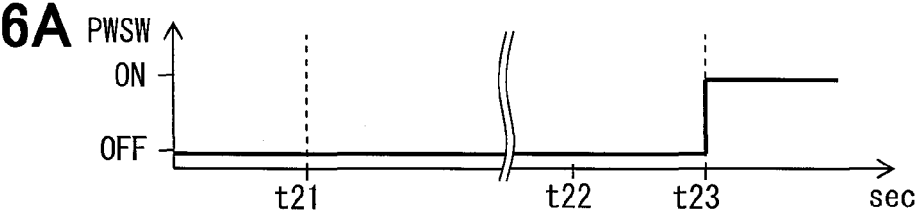
FIG. 6A to FIG. 6G are time charts showing another exemplary operation of the motor control apparatus according to the first embodiment.
Figure 6B:
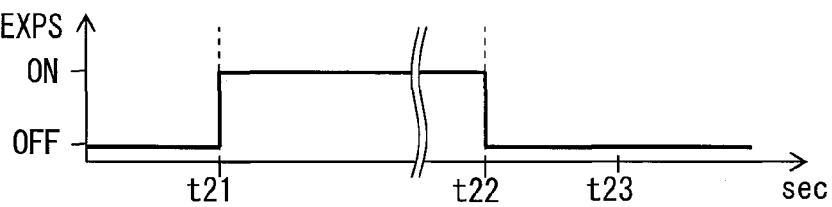
Figure 6C:
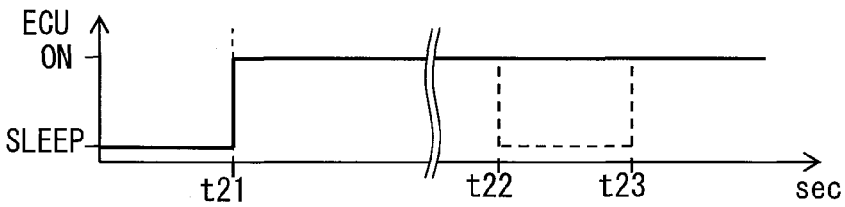
Figure 6D:
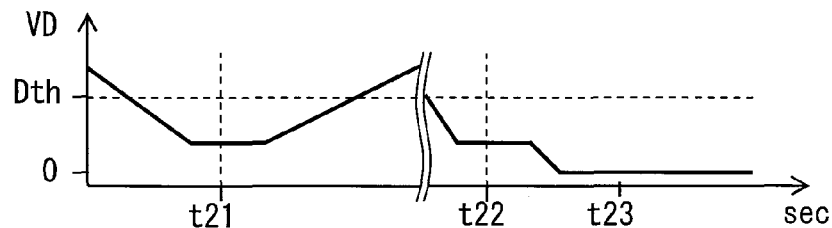
Figure 6E:
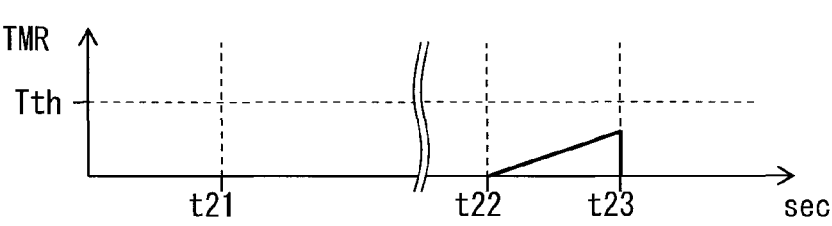
Figure 6F:
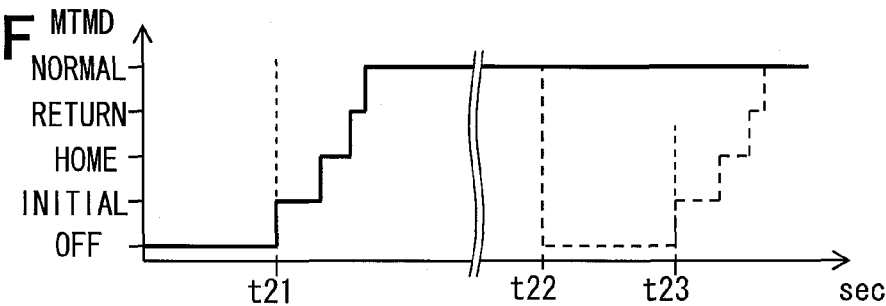
Figure 6G:
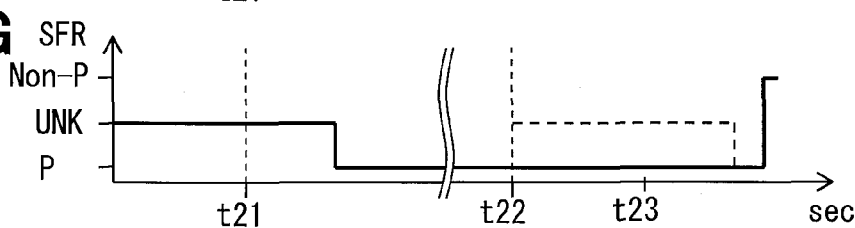
Figure 8A:
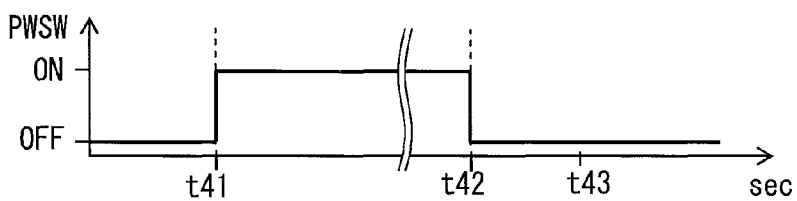
FIG. 8A to FIG. 8G are time charts showing another exemplary operation of the motor control apparatus according to the first embodiment.
Figure 8B:
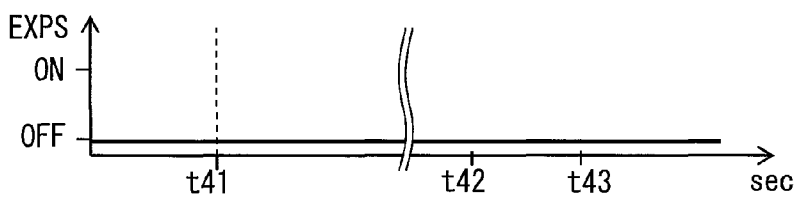
Figure 8C:
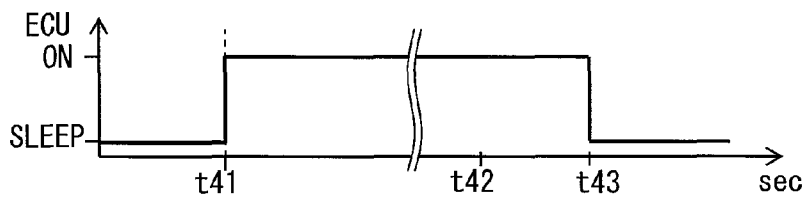
Figure 8D:
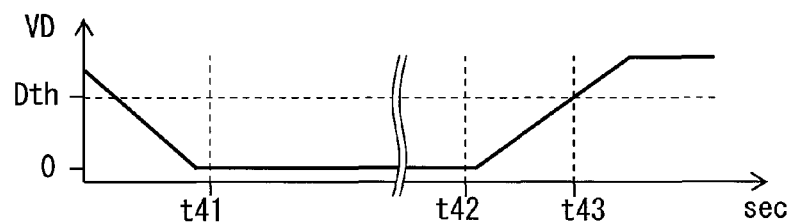
Figure 8E:
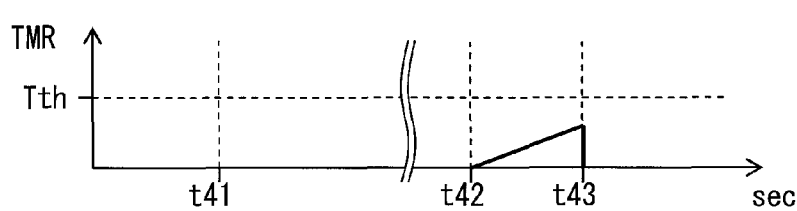
Figure 8F:
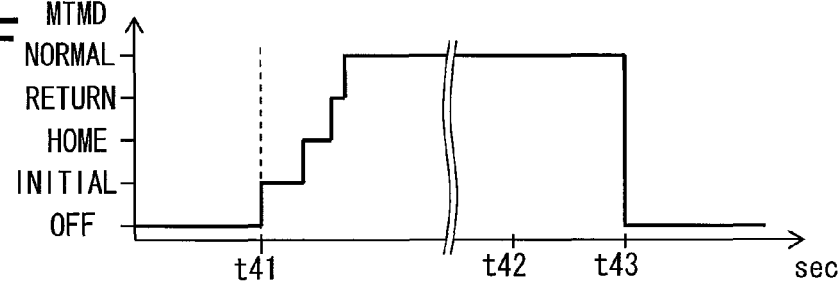
Figure 8G:
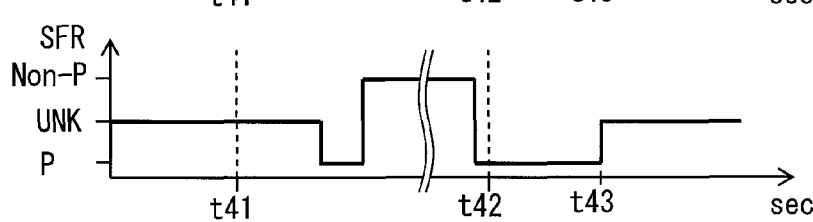
Figure 9A:
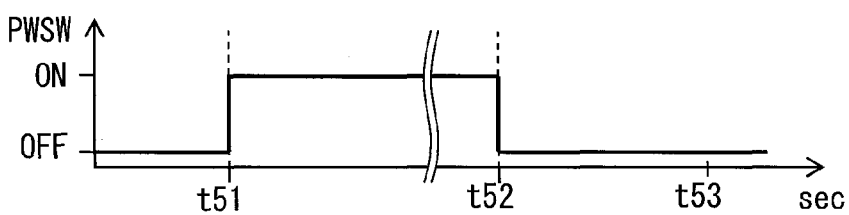
FIG. 9A to FIG. 9G are time charts showing another exemplary operation of the motor control apparatus according to the first embodiment.
Figure 9B:
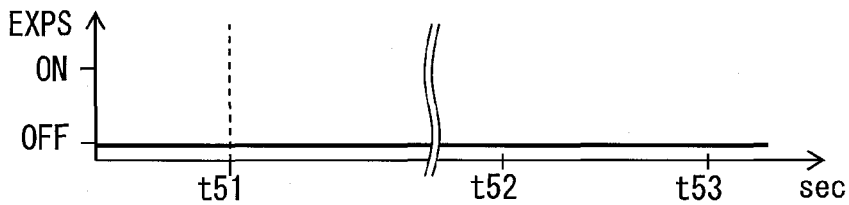
Figure 9C:
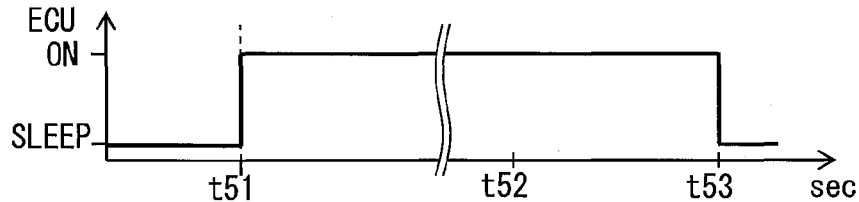
Figure 9D:
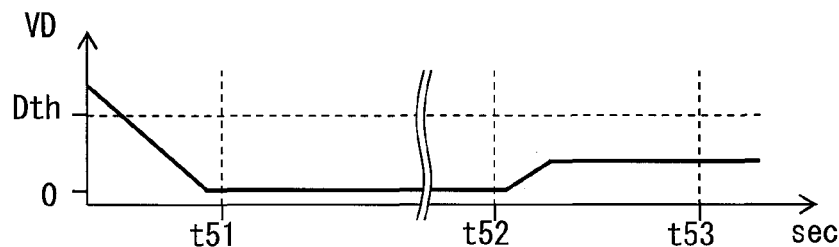
Figure 9E:
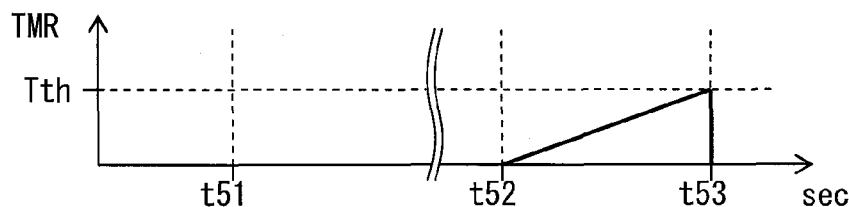
Figure 9F:
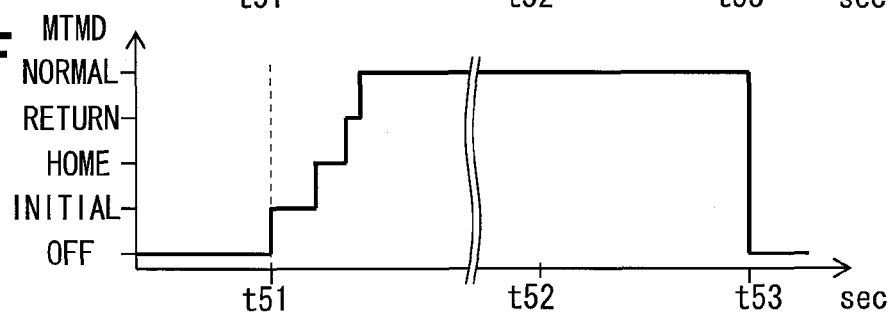
Figure 9G:
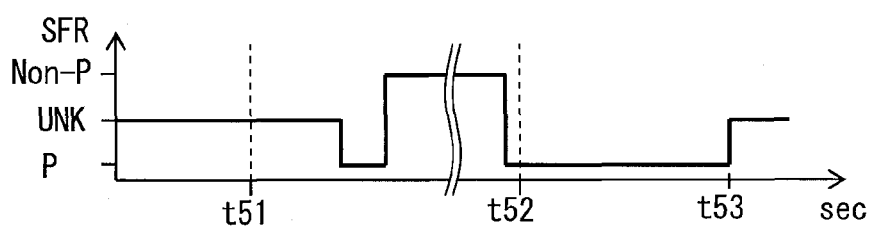

FIG. 6A to FIG. 6G are time charts respectively showing an operation state of the power switch 31, a connection state of the external power source 33, an operation state of the motor control unit 21, a distance VD between the vehicle 10 and the user, an elapsed time TMR measured by the timer section, an operation mode of the electric motor 7, and a shift range of the power transmission mechanism 3. FIG. 6A to FIG. 6G are time charts showing another exemplary operation of the motor control apparatus 1 according to the first embodiment. The exemplary operation of the motor control apparatus 1 is executed in a case where the vehicle 10 is driven by the user after the vehicle 10 is charged. When the user moves toward the vehicle 10, the distance VD gradually decreases. The user manipulates the connection member 34 near the vehicle 10 in order to charge the vehicle 10. At a point t21, the user couples the external power source 33 to the vehicle 10 by manipulating the connection member 34. When the external power source 33 is coupled, the range control ECU 9 is switched from the SLEEP state to the ON state. At the same time, the homing control is executed. When the homing control is executed, the home position of the electric motor 7 is defined, and the shift range is switched from the undetermined position to the P position. After coupling the external power source 33 to the vehicle 10 by manipulating the connection member 34, the user may move away from the vehicle 10 at a distance greater than the threshold distance Dth. Even when the user is apart from the vehicle 10 at the distance greater than the threshold distance Dth, since the external power source 33 is coupled to the vehicle 10, the range control ECU 9 is maintained in the ON state. When the user returns and moves toward the vehicle 10, the distance VD gradually decreases. At a point t22, the user stops charging the vehicle 10 and uncouples the external power source 33 from the vehicle 10 by manipulating the connection member 34. When the external power source 33 is not coupled to the vehicle 10, the timer section 25 starts measuring the elapsed time TMR from the point t22. Then, the user gets in the vehicle 10, and at a point t23, the user operates the power switch 31 to the ON state. In this case shown in FIG. 6A to FIG. 6G, the range control ECU 9 does not enter the SLEEP state after the execution of the homing control, which is executed in response to a satisfaction of the second condition item, that is, the external power source 33 is coupled to the vehicle 10 via the connection member 34. Thus, when the power switch 31 is operated to the ON state at the point t23, the information of the home position obtained by the homing control executed at the point t21 is reserved. Thus, during the point t22 to the point t23, the homing control shown by a dashed line in FIG. 6C is prevented from being executed again.

FIG. 7A to FIG. 7G are time charts respectively showing an operation state of the power switch 31, a connection state of the external power source 33, an operation state of the motor control unit 21, a distance VD between the vehicle 10 and the user, an elapsed time TMR measured by the timer section, an operation mode of the electric motor 7, and a shift range of the power transmission mechanism 3. FIG. 7A to FIG. 7G are time charts showing another exemplary operation of the motor control apparatus 1 according to the first embodiment. The exemplary operation of the motor control apparatus 1 is executed in a case where the vehicle 10 is driven by the user, then the vehicle is charged, and then the vehicle 10 is driven by the user again. At a point t31, when the power switch 31 is set to the ON state by the user, the homing control is executed. Then, the vehicle 10 is driven by the user until a point t32. When the power switch 31 is set to the OFF state at the point t32, the timer section 25 starts measuring the elapsed time TMR. After the point t32, the user gets out of the vehicle 10, and couples the external power source 33 to the vehicle 10 by manipulating the connection member 34. At a point t33, the external power source 33 is coupled to the vehicle 10 via the connection member 34. In this case shown in FIG. 7A to FIG. 7G, the user manipulates the connection member 34 within the distance VD, which is less than the threshold distance Dth, and within the threshold tie Tth. Thus, the range control ECU 9 is maintained in the ON state, and does not enter the SLEEP state. Thus, during the point t32 to the point t33, the homing control shown by a dashed line in FIG. 7C is prevented from being executed again. After the point t33, the external power source 33 is coupled to the vehicle 10 via the connection member 34. Thus, the range control ECU 9 is maintained in the ON state, and does not enter the SLEEP state. At a point t34, the user stops the charging and uncouples the external power source 33 from the vehicle 10 by manipulating the connection member 34. When the external power source 33 is not coupled to the vehicle 10, the timer section 25 starts measuring the elapsed time TMR from the point t34. Then, the user gets in the vehicle 10, and at a point t35, the user sets the power switch 31 to the ON state. In this case shown in FIG. 7A to FIG. 7G, the range control ECU 9 does not enter the SLEEP state after the execution of the homing control, which is executed in response to the satisfaction of the second condition item, that is, the external power source 33 is coupled to the vehicle 10. Thus, when the power switch 31 is set to the ON state at the point t35, the information of the home position obtained by the homing control executed at the point t31 is reserved. Thus, during the point t34 to the point t35, the homing control shown by a dashed line in FIG. 7C is prevented from being executed again. In this case shown in FIG. 7A to FIG. 7G, the user couples the external power source 33 to the vehicle 10 by manipulating the connection member 34 within the distance VD, which is less than the threshold distance Dth, and within the threshold time Tth. Thus, the range control ECU 9 is maintained in the ON state, and does not enter the SLEEP state. Thus, during the point t32 to the point t32 and the point t34 to the point t35, the homing control is prevented from being executed again as shown by the dashed lines in FIG. 7C.

FIG. 8A to FIG. 8G are time charts respectively showing an operation state of the power switch 31, a connection state of the external power source 33, an operation state of the motor control unit 21, a distance VD between the vehicle 10 and the user, an elapsed time TMR measured by the timer section, an operation mode of the electric motor 7, and a shift range of the power transmission mechanism 3. FIG. 8A to FIG. 8G are time charts showing another exemplary operation of the motor control apparatus 1 according to the first embodiment. The exemplary operation of the motor control apparatus 1 is executed in a case where the vehicle 10 is driven by the user, then the user moves away from the vehicle 10 without charging the vehicle 10. The user gets in the vehicle 10, and at a point t41, the user sets the power switch 31 to the ON state. When the power switch 31 is set to the ON state, the homing control is executed and the home position of the electric motor 7 is defined. The user drives the vehicle 10 from the point t41 to a point t42, and at the point t42, the user sets the power switch 31 to the OFF state. In this case shown in FIG. 8A to FIG. 8G, the user rapidly moves away from the vehicle 10. Thus, the distance VD is greater than the threshold distance Dth at a point t43. In response to the VD that is greater than the threshold distance Dth, the range control ECU 9 enters the SLEEP state. Thus, the electric motor 7 is operated to the OFF state, and the shift range returns to the undetermined position.

FIG. 9A to FIG. 9G are time charts respectively showing an operation state of the power switch 31, a connection state of the external power source 33, an operation state of the motor control unit 21, a distance VD between the vehicle 10 and the user, an elapsed time TMR measured by the timer section, an operation mode of the electric motor 7, and a shift range of the power transmission mechanism 3. FIG. 9A to FIG. 9G are time charts showing another exemplary operation of the motor control apparatus 1 according to the first embodiment. The exemplary operation of the motor control apparatus 1 is executed in a case where the vehicle 10 is driven by the user, then the user stays near the vehicle 10 for a long time without charging the vehicle 10. The user gets in the vehicle 10, and at a point t51, the user sets the power switch 31 to the ON state. When the power switch 31 is set to the ON state, the homing control is executed and the home position of the electric motor 7 is defined. The user drives the vehicle from the point t51 to a point t52, and at the point t52, the user sets the power switch 31 to the OFF state. In this case shown in FIG. 9A to FIG. 9G, the user stays near the vehicle 10. Thus, the distance VD is less than the threshold distance Dth during the user stays near the vehicle 10. From the point t52, the timer section 25 starts to measure the elapsed time TMR. When the elapsed time TMR measured from the point t52 is equal to the threshold time Tth at a point t53, the range control ECU enters the SLEEP state. Thus, the electric motor 7 is operated to the OFF state, and the shift range returns to the undetermined position.

In the present embodiment, the homing control is executed when the predetermined initialization condition is satisfied. The initialization condition may be satisfied frequently. Thus, the homing control is controlled to be forbidden during the user of the vehicle stays within a distance less than the threshold distance from the vehicle even when the initialization condition is satisfied again. Thus, the homing control is prevented from being executed frequently.

(Other Embodiments)

For example, the sections and functions provided by the range control ECU 9 may be configured only by software or only by hardware. Alternatively, the sections and functions provided by the range control ECU 9 may be configured by a combination of software and hardware. In other words, the range control ECU 9 may be configured by an analogue circuit. For example, the timer section 25 may be configured by software. Alternatively, a part or the whole part of the timer section 25 may be configured by hardware.

In the present embodiment, the range control ECU 9 controls the electric motor to switch the shift range between the P position and the Non-P position. Alternatively, the range control ECU may control the electric motor to switch among three or more positions. For example, the positions may include a park position, a reverse position, a neutral position, and a drive position.

In the present embodiment, the vehicle 10 is described as a hybrid vehicle. Alternatively, the vehicle 10 may be a vehicle, which only uses the internal-combustion engine as the power source. Alternatively, the vehicle 10 may be a vehicle, which only uses the electric traction motor as the power source.

The above disclosure has the following aspects.

According to an aspect of the present disclosure, a motor control apparatus includes an electric motor, a homing control section, a distance determination section, and a forbiddance section. The electric motor moves a control object equipped to a vehicle at least between two positions. The homing control section executes a homing control for controlling the electric motor to move the control object so that the control object press-contacts a stopper wall when an initialization condition is satisfied. The distance determination section determines whether a user of the vehicle is apart from the vehicle at a distance greater than a predetermined distance. The forbiddance section forbids the homing control section to execute the homing control again during a period, which starts at a time when the homing control is executed and ends at a time when the distance determination section determines that the user of the vehicle is apart from the vehicle at the distance greater than the predetermined distance, even when the initialization condition is satisfied during the period.

In the above apparatus, the homing control is executed when the initialization condition is satisfied. The initialization condition may be frequently satisfied. Thus, the homing control is controlled to be forbidden during the user of the vehicle stays within a distance less than the predetermined distance from the vehicle even when the initialization condition is satisfied again. Thus, the homing control is prevented from being executed frequently, thereby reducing the number of executions of homing control.

Alternatively, the initialization condition may include one or more condition items. When one of the condition items is satisfied, the initialization condition is determined to be satisfied.

Alternatively, the forbiddance section may include a condition determination section, a first forbiddance section, and a second forbiddance section. The condition determination section may determine whether the initialization condition is switched to failure. The first forbiddance section may forbid the homing control section to execute the homing control during a first period, which starts at the time when the homing control is executed and ends at a time when the condition determination section determines that the initialization condition is switched to failure. The second forbiddance section may forbid the homing control section to execute the homing control during a second period, which starts at the time when the condition determination section determines that the initialization condition is switched to failure and ends at the time when the distance determination section determines that the user of the vehicle is apart from the vehicle at the distance greater than the predetermined distance, even when the initialization condition is satisfied during the second period. In this case, after the homing control is executed in response to a satisfaction of the initialization condition, the homing control is forbidden to be executed again during the initialization condition is maintained in a satisfied state.

Alternatively, the forbiddance section may permit the homing control section to execute the homing control under a condition that, after the condition determination section determines that the initialization condition is switched to failure, the distance determination section determines that the user of the vehicle is apart from the vehicle at the distance greater than the predetermined distance. In this case, when the initialization condition is switched to failure and the user is apart from the vehicle at a distance greater than the predetermined distance, the homing control is permitted to be executed.

Alternatively, the motor control apparatus may further include a power switch that is operated to an ON state when the user drives the vehicle, and the one of the condition items may be whether the power switch is in the ON state. In this case, the number of executions of homing control is reduced even when the homing control is configured to be executed in response to operating the power switch to the ON state.

Alternatively, the motor control apparatus may further include a timer section that measures an elapsed time during which the user of the vehicle stays within the predetermined distance from the vehicle. In a case where the elapsed time measured by the timer section is longer than a predetermined time period, the forbiddance section may permit the homing control section to execute the homing control. In this case, when the user stays near the vehicle for a long time period, the homing control is executed in response to the long time period, which is longer than the predetermined time period.

Alternatively, the motor control apparatus may further include a setting section that sets the predetermined time period according to a position of the vehicle. In this case, the predetermined time is variable. Thus, the predetermined time period may be set according to a position of the vehicle. In other words, the predetermined time period during which the homing control is forbidden may be set differently according to the position of the vehicle.

Alternatively, the motor control apparatus may further include a connection member that couples an external power source to the vehicle so that a secondary battery equipped to the vehicle is charged by the external power source, and the one of the condition items may be whether the connection member is coupled to the vehicle. In this case, the number of executions of homing control is reduced even when the homing control is configured to be executed in response to coupling the external power source to the vehicle. Specifically, in a case where the vehicle is equipped with a secondary battery, which needs to be charged by the external power source, a durability of the vehicle is less likely to be reduced by reducing the number of executions of homing control.

Alternatively, the motor control apparatus may further include a connection member and a record section. The connection member may couple an external power source to the vehicle so that a secondary battery equipped to the vehicle is charged by the external power source. The record section may record information of a charging position where the external power source is coupled to the vehicle. The one of the condition items is whether the connection member is coupled to the vehicle. When the vehicle is located at the charging position recorded by the record section, the setting section may set another predetermined time period to be different from the predetermined time period. In this case, the position of the vehicle, at which the external power source is coupled to the vehicle, is recorded. The setting section sets the predetermined time period differently according to a determination result indicating whether a position of the vehicle is the recorded position. Thus, the predetermined time period is set differently in a case where the vehicle is possible to being charged.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A motor control apparatus comprising:
an electric motor that moves a control object equipped to a vehicle at least between two positions;
a homing control section, using a processor, that executes a homing control for controlling the electric motor to move the control object so that the control object press-contacts a shift parking position stopper wall when at least one of a plurality of initialization conditions is satisfied;
a distance determination section, using the processor, that determines whether a user of the vehicle is apart from the vehicle at a distance greater than a predetermined distance; and
a forbiddance section, using the processor, that forbids the homing control section to execute the homing control again during a period, which starts at a time when the homing control is executed and ends at a time when the distance determination section determines that the user of the vehicle is apart from the vehicle at the distance greater than the predetermined distance, even when the at least one of the initialization conditions is satisfied during the period.

2. The motor control apparatus according to claim 1, wherein the forbiddance section includes:
a condition determination section that determines whether the at least one of the plurality of initialization conditions is switched to failure;
a first forbiddance section that forbids the homing control section to execute the homing control during a first period, which starts at the time when the homing control is executed and ends at a time when the condition determination section determines that the at least one of the plurality of initialization conditions is switched to failure; and
a second forbiddance section that forbids the homing control section to execute the homing control during a second period, which starts at the time when the condition determination section determines that the at least one of the plurality of initialization conditions is switched to failure and ends at the time when the distance determination section determines that the user of the vehicle is apart from the vehicle at the distance greater than the predetermined distance, even when the at least one of the plurality of initialization conditions is satisfied during the second period.

3. The motor control apparatus according to claim 1, wherein the forbiddance section permits the homing control section to execute the homing control when the distance determination section determines that the user of the vehicle is apart from the vehicle at the distance greater than the predetermined distance after the condition determination section determines that the at least one of the plurality of initialization conditions is switched to failure.

4. The motor control apparatus according to claim 1, further comprising
a power switch that is operated to an ON state when the user drives the vehicle,
herein the plurality of initialization conditions include whether the power switch is in the ON state.

5. The motor control apparatus according to claim 1, further comprising
a timer section, using the processor, that measures an elapsed time during which the user of the vehicle stays within the predetermined distance from the vehicle,
wherein in a case where the elapsed time measured by the timer section is longer than a predetermined time period, the forbiddance section permits the homing control section to execute the homing control.

6. The motor control apparatus according to claim 5, further comprising
a setting section, using the processor, that sets the predetermined time period according to a position of the vehicle.

7. The motor control apparatus according to claim 1, further comprising
a connection member, to which an external power source is coupled, so that a secondary battery equipped to the vehicle is charged by the external power source,
wherein the plurality of initialization conditions include whether the external power source is coupled to the connection member.

8. The motor control apparatus according to claim 6, further comprising
a connection member, to which an external power source is coupled, so that a secondary battery equipped to the vehicle is charged by the external power source; and
a record section, using the processor, that records information of a charging position where the external power source is coupled to the connection member,
wherein the plurality of initialization conditions include whether the external power source is coupled to the connection member, and
wherein the setting section sets the predetermined time period differently according to a condition whether the vehicle is located at the charging position recorded by the record section.

* * * * *